(12) United States Patent
McArdle

(10) Patent No.: US 7,218,924 B2
(45) Date of Patent: May 15, 2007

(54) METHOD FOR RESTRICTING CALLS TO A CELL PHONE

(75) Inventor: James Michael McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 11/105,610

(22) Filed: Apr. 14, 2005

(65) Prior Publication Data

US 2006/0234711 A1 Oct. 19, 2006

(51) Int. Cl.
*H04M 3/00* (2006.01)

(52) U.S. Cl. .............. 455/418; 455/445; 455/416; 455/456.4; 379/210.02; 379/211.02

(58) Field of Classification Search ........... 455/418, 455/445, 416, 456.4; 379/210.02, 211.02
See application file for complete search history.

(56) References Cited

U.S. PATENT DOCUMENTS

| | | | | |
|---|---|---|---|---|
| 5,749,052 | A | 5/1998 | Hidem et al. ............. | 455/406 |
| 6,011,973 | A | 1/2000 | Valentine et al. ......... | 455/456 |
| 6,564,047 | B1 | 5/2003 | Steele et al. ............. | 455/405 |
| 6,591,105 | B1 | 7/2003 | Hussain et al. ........... | 455/444 |
| 6,647,255 | B1 | 11/2003 | Nilsson .................... | 455/409 |
| 6,650,894 | B1 | 11/2003 | Berstis et al. ............ | 455/420 |
| 6,754,481 | B1 | 6/2004 | Nilsson .................... | 455/406 |
| 2001/0021648 | A1 | 9/2001 | Fougnies et al. ......... | 455/408 |
| 2002/0082002 | A1* | 6/2002 | Fujii ....................... | 455/419 |
| 2002/0126821 | A1 | 9/2002 | Barak et al. .............. | 379/219 |
| 2003/0007621 | A1 | 1/2003 | Graves et al. ............ | 379/219 |
| 2003/0076941 | A1 | 4/2003 | Tiliks et al. ............. | 379/196 |
| 2003/0143954 | A1 | 7/2003 | Dettinger et al. ......... | 455/46 |
| 2004/0019695 | A1 | 1/2004 | Fellenstein et al. ....... | 709/239 |
| 2004/0219932 | A1* | 11/2004 | Verteuil .................. | 455/456.2 |
| 2005/0117730 | A1* | 6/2005 | Mullis et al. ............. | 379/210.02 |
| 2005/0186974 | A1* | 8/2005 | Cai .......................... | 455/466 |
| 2005/0202830 | A1* | 9/2005 | Sudit ....................... | 455/456.1 |
| 2006/0148490 | A1* | 7/2006 | Bates et al. ............. | 455/456.1 |

* cited by examiner

*Primary Examiner*—Danh Le
(74) *Attorney, Agent, or Firm*—Mark S. Walker; Suiter Swantz pc llo

(57) ABSTRACT

The present invention is a method for restricting calls to a cell phone, including the steps of: receiving restriction information; testing an incoming call to the cell phone against the restriction information; and, if testing determines that the incoming call is restricted, routing the incoming call to a voice mail system, wherein routing is accomplished without disturbing a call recipient with the incoming call; or, if testing determines that the incoming call is not restricted, connecting the incoming call.

20 Claims, 4 Drawing Sheets

|        | SUN | MON | TUE | WED | THU | FRI | SAT |
|--------|-----|-----|-----|-----|-----|-----|-----|
| 6-7AM  |     |     |     |     |     |     |     |
| 7-8AM  |     |     |     |     |     |     |     |
| 8-9AM  |     | I   | I   | I   | I   | I   |     |
| 9-10AM |     | O   | O   | O   | O   | O   |     |
| 10-11AM|     | I/O | I/O | I/O | I/O | I/O |     |
| 11-12PM|     | I/O | I/O | I/O | I/O | I/O |     |
| 12-1PM |     |     |     |     |     |     |     |
| 1-2PM  |     | I/O | I/O | I/O | I/O | I/O |     |
| 2-3PM  |     | I/O | I/O | I/O | I/O | I/O |     |
| 3-4PM  |     | I   | I   | I   | I   | I   |     |
| 4-5PM  |     |     |     |     |     |     |     |
| 5-6PM  |     |     |     |     |     |     |     |
| 6-7PM  |     |     |     |     |     |     |     |
| 7-8PM  |     |     |     |     |     |     |     |
| 8-9PM  |     |     |     |     |     |     |     |
| 9-10PM |     |     |     |     |     |     |     |
| 10-11PM|     |     |     |     |     |     |     |
| 11-12AM|     |     |     |     |     |     |     |
| 12-1AM |     |     |     |     |     |     |     |
| 1-2AM  |     |     |     |     |     |     |     |
| 2-3AM  |     |     |     |     |     |     |     |
| 3-4AM  |     |     |     |     |     |     |     |
| 4-5AM  |     |     |     |     |     |     |     |
| 5-6AM  |     |     |     |     |     |     |     |

KEY: I= INCOMING CALLS RESTRICTED
O= OUTGOING CALLS RESTRICTED
I/O= INCOMING & OUTGOING CALLS RESTRICTED

*FIG. 2*

METHOD FOR RESTRICTING CALLS TO A CELL PHONE

FIELD OF THE INVENTION

The present invention relates to the field of telecommunications and particularly to a method for restricting calls to a cell phone.

BACKGROUND OF THE INVENTION

Today, cell phones are used by a number of people, even teenagers. For example, high school students often carry cell phones provided by their parents so that they may make or receive emergency phone calls. However, problems often arise when a student receives non-emergency phone calls from friends at inopportune times, for example, while the student is attending a class. Such phone calls can be disruptive to the student and to the student's classmates.

Therefore, it would be advantageous to have a method for restricting calls to a cell phone, such that a cell phone user will not be disturbed when non-emergency phone calls are placed to his or her cell phone at inopportune times, but will be alerted when emergency phone calls are placed to the cell phone.

SUMMARY OF THE INVENTION

Accordingly, an embodiment of the present invention is directed to a method for restricting calls to a cell phone, which includes the steps of: receiving restriction information; testing an incoming call to the cell phone against the restriction information; and, if testing determines that the incoming call is restricted, routing the incoming call to a voicemail system, wherein routing is accomplished without disturbing a call recipient with the incoming call; or, if testing determines that the incoming call is not restricted, connecting the incoming call.

A further embodiment of the present invention is directed to a method for restricting incoming and outgoing cell phone calls, which includes the steps of: receiving restriction information; testing incoming and outgoing calls made to and from the cell phone against the restriction information; and, if testing determines that a call is restricted, preventing the call from being connected; or, if testing determines that a call is not restricted, allowing the call to be connected.

An additional embodiment of the present invention is directed to a method for restricting calls to a cell phone, which includes the steps of: receiving restriction information; receiving an incoming telephone call placed to the cell phone; determining if the call was placed during a restricted period, wherein if a determination is made that the call was not placed during a restricted period, connecting the incoming call; wherein if a determination is made that the call was placed during a restricted period, determining if the call originated from a non-restricted number; wherein if a determination is made that the call originated from a non-restricted number, connecting the incoming call; and, if a determination is made that the call did not originate from a non-restricted number, routing the call as specified in the restriction information without disturbing a called party.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 2 is an illustration of a web page of a web-based service, the web page configured for receiving restriction information in accordance with an exemplary embodiment of the present invention;

DETAILED DESCRIPTION OF THE INVENTION

Reference will now be made in detail to the presently preferred embodiments of the invention, examples of which are illustrated in the accompanying drawings.

Figure 1:
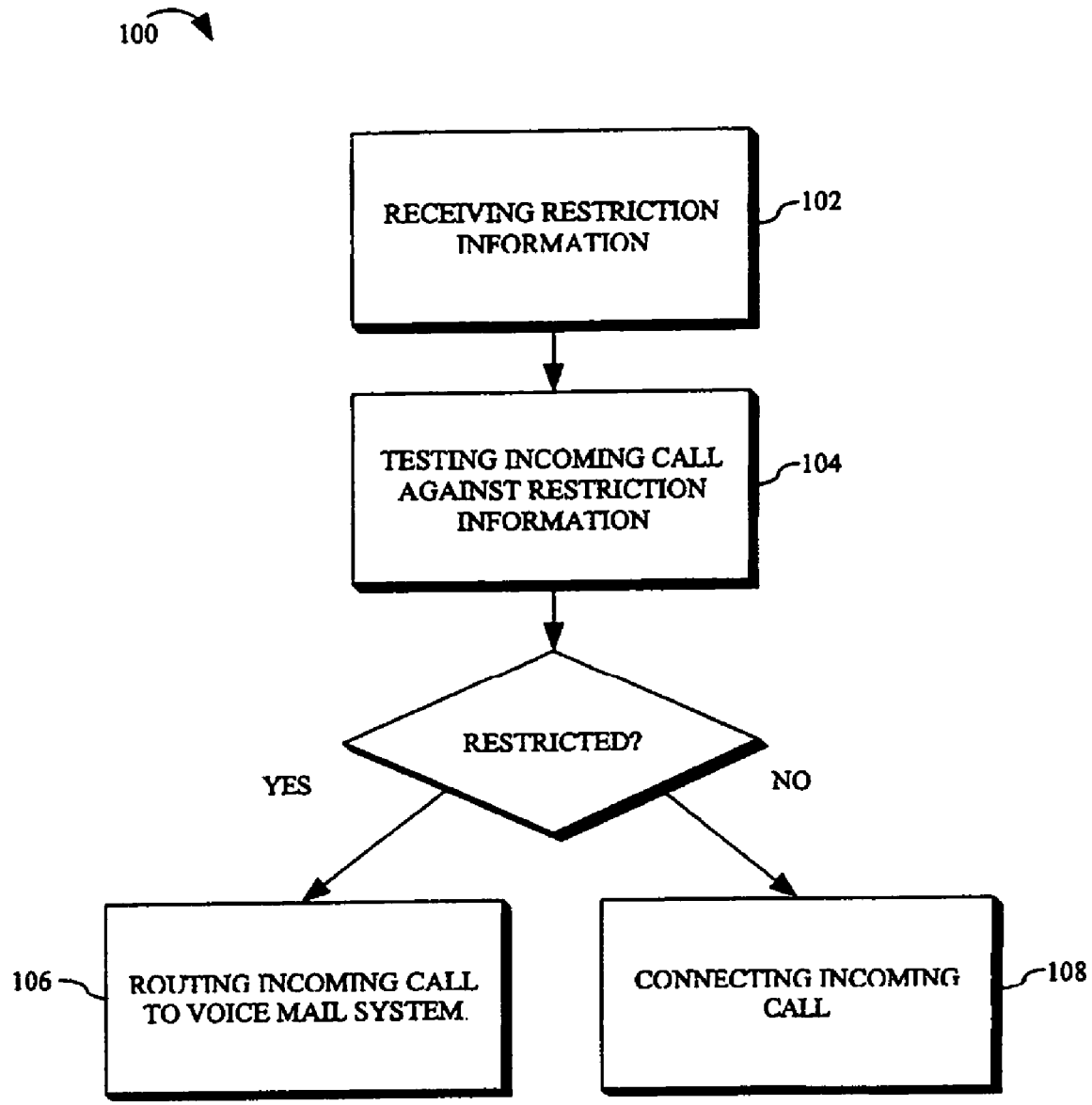
FIG. 1 is a flowchart illustrating a method for restricting calls to a cell phone in accordance with an exemplary embodiment of the present invention.

Referring to FIG. 1, a method 100 for restricting calls to a cell phone in accordance with an embodiment of the present invention is discussed. Method 100 includes receiving restriction information 102. In a present embodiment, a cell phone service provider receives restriction information from a cell phone service subscriber. The restriction information specifies the manner in which calls made to the subscriber's cell phone shall be restricted. For example, the cell phone subscriber may be a parent who has a teenage child attending high school. The parent has purchased the cell phone for the teen, so that the teen can carry the phone to school and have the phone available for emergency use. However, the parent anticipates that the teen's friends may call the cell phone numerous times during the school day. Consequently, the parent wants to ensure that the teen is not disturbed by non-emergency phone calls (from the teen's friends, etc.) made to the cell phone during inopportune times, such as when the teen is attending a class. At the same time, the parent would still like the teen to be able to leave the cell phone powered on during class, so that emergency calls (i.e.—from the parent) made to the cell phone can be connected. By providing restriction information to the service provider, the parent (subscriber) can restrict incoming calls to the cell phone in such a manner as to accomplish both of the above-mentioned goals. For example, the restriction information may specify restricted periods, such as times of day, days of the week, and the like, during which incoming calls to the subscriber's phone are to be restricted. For instance, a parent (subscriber) may specify that incoming calls to the cell phone carried by his or her teenage child are restricted from 8 a.m.–4 p.m., from Monday–Friday (i.e.—during school hours). By making the above specifications, the parent ensures that incoming calls made to the cell phone during those time frames will not be connected. An exception to this would be if the subscriber further specifies in the restriction information that certain phone numbers are non-restricted. For example, the parent (subscriber) may list one or more phone numbers that the he or she wants designated as non-restricted. For instance, the parent (subscriber) may designate his or her home phone number, office phone number, and the like as non-restricted. By making the above designation, the parent ensures that if he or she makes an incoming call to the cell phone from one of the numbers designated as non-restricted, the incoming call will be connected, even if the call is made during a restricted period.

In further embodiments, the subscriber may also restrict outgoing calls made from the cell phone. For example, an employer (subscriber) issues a cell phone to an employee, but is worried that the employee may try to use the cell phone for making personal phone calls. Therefore, in the restriction information, the employer may specify restriction periods, such as non-business hours, weekends, etc., during which outgoing calls are restricted. Further, the employer (subscriber) may specify in the restriction information that one or more numbers associated with the employer be designated as non-restricted, so that only outgoing calls placed to the employer may be connected.

In additional embodiments, the subscriber restricts an instant messaging function of the cell phone in a like manner. For example, during restricted periods, a user of the cell phone may only be able to send or receive instant messages via the cell phone to and from numbers designated by the subscriber as "non-restricted" in the restriction information.

In an embodiment, the cell phone service provider offers a web-based service by which it receives the restriction information from the subscriber via a computer network, such as the Internet. For example, a subscriber enters a web site address for the web-based service via a computing input device, such as a keyboard, a mouse or the like. Upon arriving at the web site for the web-based service, the subscriber may be initially prompted to enter access information verifying that the person attempting to access the web-based service is the subscriber/owner of the cell phone. Access information may include payment information (i.e.—credit card information), an account number and the like. Upon verifying the entered access information against a database of the service provider containing existing customer account information, the web-based service generates a web form that requests the subscriber's restriction information. FIG. 2 is an illustration of a web form requesting the subscriber's restriction information in accordance with an embodiment of the present invention. The subscriber proceeds to enter the restriction information and sends the completed web form to the service provider via the network. The web form, which includes the restriction information, is subsequently received by the service provider and stored in a restriction information database of the service provider.

In further embodiments, the restriction information is received by the service provider upon being communicated to the service provider by the subscriber either in person, by phone, in writing or the like. In additional embodiments, upon submitting the restriction information, the subscriber receives a password from the service provider, via e-mail, phone, in writing or the like. The password allows the subscriber to access his or her restriction information to make any desired changes. For example, the subscriber may call the service provider and, upon providing his or her password, may request changes to the restriction information, including completely overriding the restriction information (i.e.—removing all of the restrictions). In a further example, the subscriber may access the web-based service using his or her password. Upon entering the password, the web form containing the subscriber's restriction information is retrieved from the provider's restriction information database and displayed on a display of the subscriber's computer. The subscriber can then make changes to the restriction information or request that all restrictions be removed and re-submit the edited web form to the service provider.

Once the restriction information has been received 102, the method 100 further includes testing an incoming call to the subscriber's cell phone against the restriction information 104. For example, upon an incoming call being made to the subscriber's cell phone, the subscriber's cell phone service provider tests the incoming call against the subscriber's restriction information. The subscriber's restriction information may be stored in the service provider's restriction information database. If testing determines that the incoming call is not restricted, the call is connected 108. For example, if the incoming call is made during an unrestricted period, or if the incoming call originates from a phone number designated as non-restricted, the incoming call is connected. However, if testing determines that the incoming call is restricted, the incoming call will not be connected, but rather, routed elsewhere by the service provider. In a present embodiment, a restricted incoming call will be routed to a voicemail system 106. In an alternative embodiment, a restricted incoming call will be routed to a do-not-disturb message included with the voicemail system. In further embodiments, a restricted incoming call will be routed to a voicemail system, a do-not-disturb message or the like as specified by the subscriber in the restriction information. In an exemplary embodiment, routing of a restricted incoming call is accomplished without disturbing the call recipient. For example, if an incoming call is routed to a voicemail system, the call recipient's phone, even if powered on, will not ring, vibrate or the like.

Figure 3:
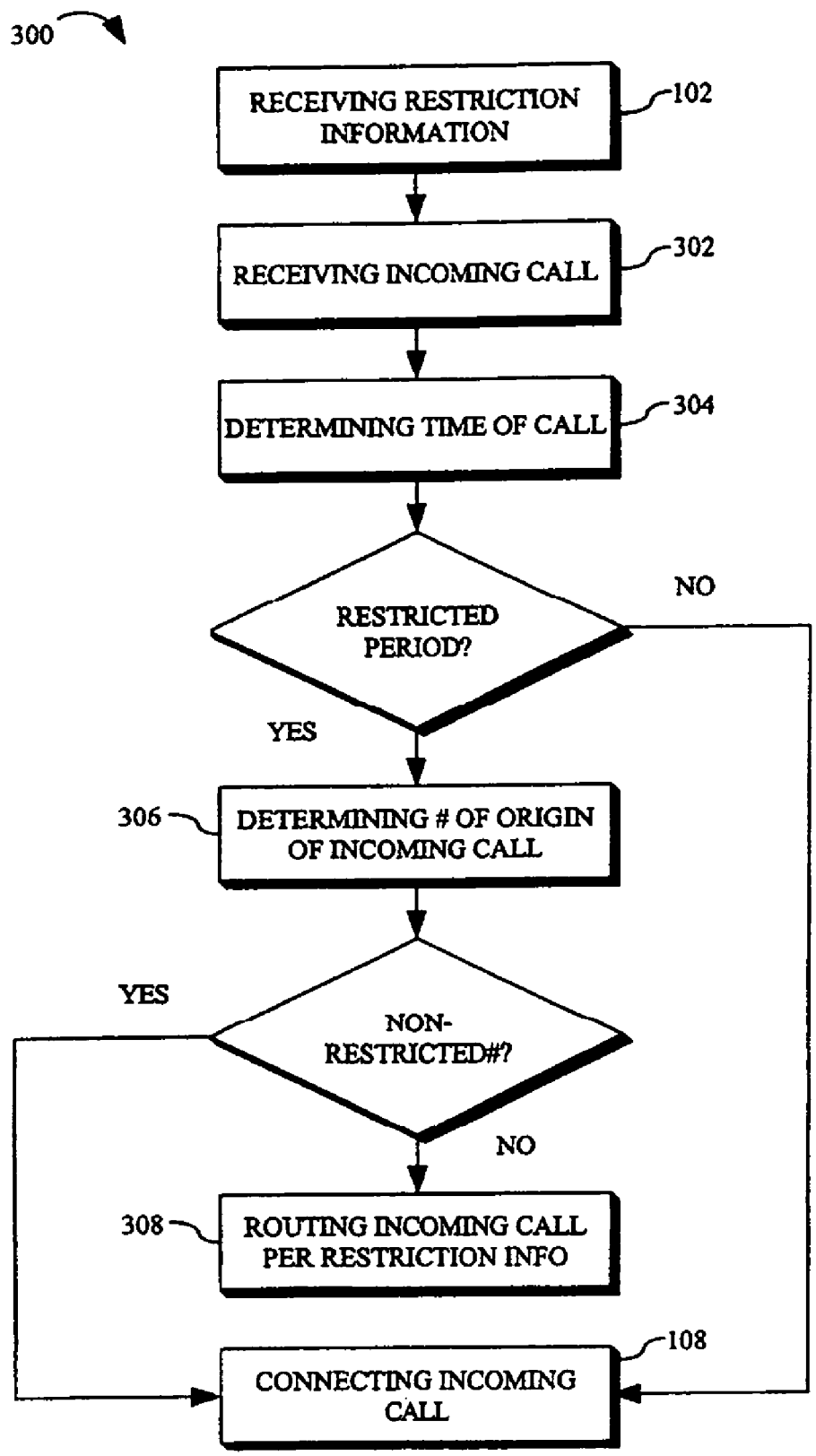
FIG. 3 is a flowchart illustrating a method for restricting calls to a cell phone in accordance with an exemplary embodiment of the present invention; and, FIG. 4 is a flowchart illustrating a method for restricting calls from a cell phone in accordance with an exemplary embodiment of the present invention.

FIG. 3 illustrates a method for restricting calls to a cell phone in accordance with an exemplary embodiment of the present invention. Method 300 includes receiving restriction information 102. In a present embodiment, a cell phone service provider receives restriction information from a cell phone service subscriber. Method 300 further includes receiving an incoming telephone call 302. In a present embodiment, the cell phone service provider receives an incoming telephone call made to the subscriber's cell phone. Upon receiving the incoming telephone call, the service provider determines the time of day that the call was made 304 in order to determine if the call was made during a restricted period. If the service provider determines that the call was not made during a restricted period, the incoming call is connected to the subscriber's cell phone 108. However, if the service provider determines that the incoming call was made during a restricted period, the method 300 further includes determining the phone number from which the incoming call originated 306. If the service provider determines that the incoming call originated from a non-restricted phone number, the incoming call is connected to the subscriber's cell phone 108. However, if the service provider determines that the incoming call did not originate from a non-restricted phone number, the incoming call is routed as specified by the subscriber in the restriction information 308. For example, the restriction information may specify that the incoming call be routed to a voicemail system, a do-not-disturb message or the like.

Figure 4:
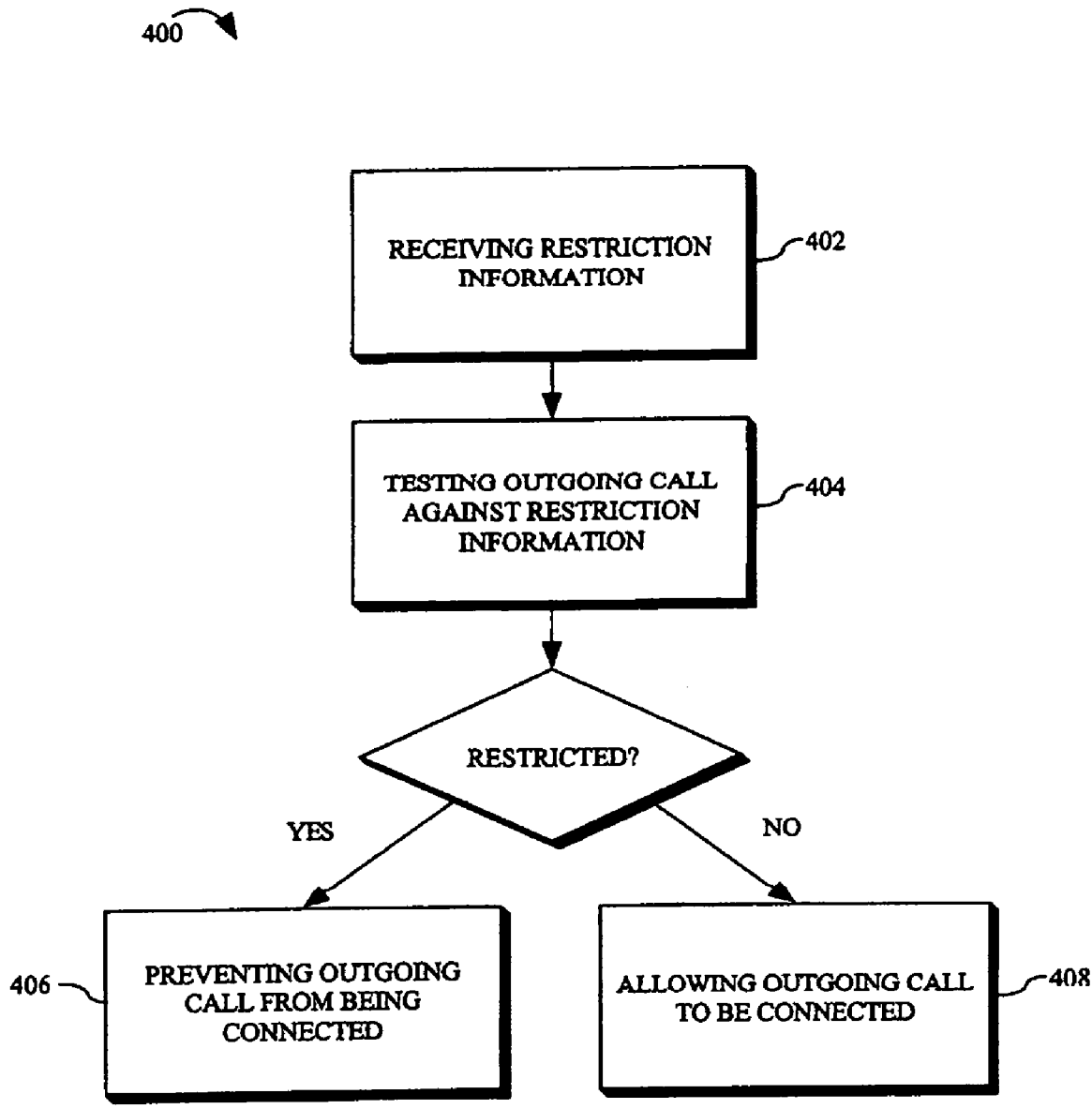

Referring to FIG. 4, a method 400 for restricting calls from a cell phone in accordance with an embodiment of the present invention is discussed. Method 400 includes receiving restriction information 402. In a present embodiment, a cell phone service provider receives restriction information from a cell phone service subscriber. For example, the restriction information includes days of the week, times of day and the like during which outgoing calls are restricted. Further, the restriction information may include numbers designated as non-restricted, (such as emergency contacts) to which outgoing calls may be made by a user of the cell phone, even during restricted periods. The method further includes testing an outgoing call against the restriction information 404. For example, upon an outgoing call being made from the subscriber's cell phone, (i.e.—upon the user of the cell phone dialing a number to make an outgoing call) the subscriber's cell phone service provider tests the outgoing call against the subscriber's restriction information. The subscriber's restriction information may be stored in the service provider's restriction information database. If testing determines that an outgoing call is restricted, (i.e.—made during a restricted period and not made to a designated non-restricted number) the method 400 further includes preventing the outgoing call from being connected 406. For example, the outgoing call is disconnected before a ring sequence begins. In further embodiments, the user of the cell phone, upon making a restricted outgoing call, is also notified via a pre-recorded message that the outgoing call cannot be connected because it is restricted. Alternatively, if testing determines that an outgoing call is not restricted, the method 400 further includes connecting the outgoing call 408 (i.e.—initiating a ring sequence).

It is important to note that while the present invention has been described as a method, those skilled in the art will appreciate that the method of the present invention is capable of being distributed in the form of a computer-readable medium of instructions in a variety of forms, and that the present invention applies equally, regardless of the particular type of signal bearing media utilized to carry out the distribution. Examples of computer readable media include: non-volatile, hard-coded type media such as read only memories (ROMs) or erasable, electrically programmable read only memories (EEPROMs), recordable-type media such as floppy disks, hard disk drives and CD-ROMs and transmission-type media such as digital and analog communication links.

It is believed that the method of the present invention and many of its attendant advantages will be understood by the forgoing description. It is also believed that it will be apparent that various changes may be made in the form, construction and arrangement of the steps thereof without departing from the scope and spirit of the invention or without sacrificing all of its material advantages. The form herein before described being merely an explanatory embodiment thereof.

What is claimed is:

1. A method for restricting calls between a first phone and a second phone, the second phone being a cell phone, comprising:
   receiving restriction information of the cell phone;
   testing an incoming call to the cell phone against the restriction information of the cell phone;
   if testing against the restriction information of the cell phone determines that the incoming call to the cell phone is restricted, routing the incoming call to a voicemail system, wherein routing is accomplished without disturbing a call recipient with the incoming call;
   if testing against the restriction information of the cell phone determines that the incoming call to the cell phone is not restricted, connecting the incoming call;
   testing an outgoing call made from the cell phone to the first phone against the restriction information of the cell phone; and
   preventing the outgoing call made from the cell phone from being connected when testing against the restriction information of the cell phone determines that the outgoing call made from the cell phone to the first phone is restricted,
   wherein the restriction information is configurable by a subscriber to cell phone service for the cell phone for restricting incoming calls placed to the cell phone and for restricting outgoing calls placed from the cell phone.

2. A method as claimed in claim 1, wherein the restriction information is received via a web-based service.

3. A method as claimed in claim 1, wherein the incoming call is restricted based upon a time of day during which the incoming call is made.

4. A method as claimed in claim 1, wherein the incoming call is restricted based upon a day of the week during which the incoming call is made.

5. A method as claimed in claim 1, wherein the incoming call is not restricted if the incoming call originates from a number designated as non-restricted in the restriction information.

6. A method as claimed in claim 1, wherein the restriction information is overridden via a password.

7. A program within a computer-readable medium for restricting calls between a first phone and a second phone, the second phone being a cell phone, comprising:
   instructions within the computer-readable medium for causing the computer to receive restriction information of the cell phone;
   instructions within the computer-readable medium for causing the computer to test an incoming call made to the cell phone against the restriction information of the cell phone;
   instructions within the computer-readable medium for causing the computer to prevent the incoming call made to the cell phone from being connected if testing against the restriction information of the cell phone determines that the incoming call is restricted;
   instructions within the computer-readable medium for causing the computer to connect the incoming call made to the cell phone if testing against the restriction information of the cell phone determines that the incoming call made to the cell phone is not restricted;
   instructions within the computer-readable medium for causing the computer to test an outgoing call made from the cell phone against the restriction information of the cell phone;
   instructions within the computer-readable medium for causing the computer to prevent the outgoing call made from the cell phone from being connected if testing against the restriction information of the cell phone determines that the outgoing call is restricted,
   wherein the restriction information is configurable by a subscriber to cell phone service for the cell phone for restricting incoming calls placed to the cell phone and for restricting outgoing calls placed from the cell phone.

8. A program as claimed in claim 7, wherein the restriction information is received via a web-based service.

9. A program as claimed in claim 7, wherein at least one of: the outgoing call and the incoming call are restricted based upon a time of day during which the call is made.

10. A program as claimed in claim 7, wherein at least one of: the outgoing call and the incoming call are restricted based upon a day of the week during which the call is made.

11. A program as claimed in claim 7, wherein the outgoing call is not restricted if the outgoing call is made to a number designated as non-restricted by the restriction information.

12. A program as claimed in claim 7, wherein the incoming call is not restricted if the incoming call originates from a number designated as non-restricted by the restriction information.

13. A program as claimed in claim 7, wherein the restriction information is overridden via a password.

14. A program as claimed in claim 7, wherein if testing determines that the incoming call is restricted, routing the incoming call to a voicemail system, wherein routing is accomplished without disturbing a call recipient with the incoming call.

15. A method for providing a service to restrict calls between a first phone and a second phone, the second phone being a cell phone, comprising:

receiving restriction information of the cell phone;

receiving an incoming telephone call placed to the cell phone;

testing the incoming telephone call placed to the cell phone against the restriction information of the cell phone to determine if the incoming call placed to the cell phone was placed during a restricted period;

connecting the incoming call when testing against the restriction information of the cell phone results in a determination that the incoming call placed to the cell phone was not placed during a restricted period;

when testing against the restriction information of the cell phone results in a determination that the incoming telephone call placed to the cell phone was placed during a restricted period, further testing the incoming telephone call placed to the cell phone against the restriction information of the cell phone to determine if the incoming call placed to the cell phone originated from a non-restricted number;

when testing against the restriction information of the cell phone results in a determination that the incoming telephone call placed to the cell phone originated from a non-restricted number, connecting the incoming call placed to the cell phone;

when testing against the restriction information of the cell phone results in a determination the incoming call placed to the cell phone did not originate from a non-restricted number, routing the call as specified in the restriction information without disturbing a called party;

testing an outgoing call made from the cell phone to the first phone against the restriction information of the cell phone; and preventing the outgoing call made from the cell phone from being connected when testing against the restriction information of the cell phone determines that the outgoing call made from the cell phone to the first phone is restricted, wherein the restriction information is configurable by a subscriber to cell phone service for the cell phone for restricting incoming calls placed to the cell phone and for restricting outgoing calls placed from the cell phone.

16. A method as claimed in claim 15, wherein the restriction information is received via a web-based service.

17. A method as claimed in claim 15, wherein a restricted period includes one or more specified time periods during which incoming calls are restricted.

18. A method as claimed in claim 15, wherein a restricted period includes one or more specified days of the week during which incoming calls are restricted.

19. A method as claimed in claim 15, wherein the restriction information includes one or more numbers designated as non-restricted.

20. A method as claimed in claim 15, wherein the restriction information is overridden via a password.

\* \* \* \* \*